(12) United States Patent
Oechsle et al.

(10) Patent No.: US 8,392,062 B2
(45) Date of Patent: Mar. 5, 2013

(54) METHOD AND DEVICE FOR AVOIDING AND/OR REDUCING THE CONSEQUENCES OF COLLISIONS UPON EVASION WITH RESPECT TO OBSTACLES

(75) Inventors: Fred Oechsle, Ludwigsburg (DE);
Wolfgang Branz, Ludwigsburg (DE);
Christian Schmidt, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1039 days.

(21) Appl. No.: 11/795,108

(22) PCT Filed: Jan. 12, 2006

(86) PCT No.: PCT/EP2006/050188
§ 371 (c)(1),
(2), (4) Date: Mar. 11, 2008

(87) PCT Pub. No.: WO2006/079589
PCT Pub. Date: Aug. 3, 2006

(65) Prior Publication Data
US 2008/0319610 A1    Dec. 25, 2008

(30) Foreign Application Priority Data
Jan. 25, 2005    (DE) .................... 10 2005 003 274

(51) Int. Cl.
*B62D 6/00* (2006.01)
*B62D 1/00* (2006.01)
*B62D 6/04* (2006.01)
*G06F 17/00* (2006.01)
*G01S 13/93* (2006.01)

(52) U.S. Cl. ............ 701/41; 701/48; 701/519; 701/301; 340/435; 340/436

(58) Field of Classification Search ............... 701/1, 29, 701/36, 41, 45, 70, 71, 72, 48, 78, 93, 96, 701/97, 300, 301, 29.1, 29.2, 400, 408, 514, 701/515, 519; 340/901, 903, 904, 435, 436, 340/438; 180/271, 272, 275, 280; 303/121, 303/125, 138–140, 146
See application file for complete search history.

(56) References Cited

U.S. PATENT DOCUMENTS

| 6,017,101 | A | 1/2000 | Matsuda et al. |
| 7,015,805 | B2 * | 3/2006 | Knoop et al. ................ 340/467 |
| 7,016,783 | B2 * | 3/2006 | Hac et al. ..................... 701/301 |
| 7,124,027 | B1 * | 10/2006 | Ernst et al. ................... 701/301 |
| 7,388,513 | B2 * | 6/2008 | Kubo ............................ 340/903 |

(Continued)

FOREIGN PATENT DOCUMENTS

| DE | 38 30 790 | 3/1990 |
| DE | 198 31 071 | 1/2000 |

(Continued)

*Primary Examiner* — Thomas Tarcza
*Assistant Examiner* — Edward Pipala
(74) *Attorney, Agent, or Firm* — Kenyon & Kenyon LLP

(57) ABSTRACT

A method and a device for assisting a driver of a vehicle to avoid collisions with obstacles are provided, in which method at least one obstacle is detected by way of at least one surroundings sensor, and data of the obstacle are ascertained. On the basis of the data of the obstacle and data of the vehicle, a vehicle deceleration that is favorable for assistance of an evasive operation is ascertained, and the vehicle is correspondingly decelerated.

17 Claims, 4 Drawing Sheets

U.S. PATENT DOCUMENTS

| | | | |
|---|---|---|---|
| 7,607,741 B2 * | 10/2009 | Seto et al. | 303/193 |
| 2003/0111287 A1 * | 6/2003 | Enomoto | 180/274 |
| 2003/0220738 A1 | 11/2003 | Abe et al. | |
| 2004/0088097 A1 * | 5/2004 | Fujinami et al. | 701/70 |
| 2005/0065688 A1 * | 3/2005 | Rao et al. | 701/45 |
| 2005/0107955 A1 * | 5/2005 | Isaji et al. | 701/301 |
| 2006/0282218 A1 * | 12/2006 | Urai et al. | 701/301 |
| 2007/0192030 A1 * | 8/2007 | Tanimichi et al. | 701/301 |
| 2007/0282530 A1 * | 12/2007 | Meister et al. | 701/301 |
| 2007/0294019 A1 * | 12/2007 | Nishira et al. | 701/70 |

FOREIGN PATENT DOCUMENTS

| | | |
|---|---|---|
| DE | 101 18 707 | 10/2002 |
| DE | 102 31 584 | 3/2003 |
| DE | 102 31 557 | 7/2003 |
| DE | 102 20 567 | 11/2003 |
| DE | 10 2004 008894 | 9/2005 |
| EP | 0 433 322 | 11/1994 |
| EP | 0 891 903 | 1/1999 |
| EP | 1 251 051 | 10/2002 |
| EP | 1 300 275 | 4/2003 |
| JP | 5-58319 | 3/1993 |
| JP | 6-298022 | 10/1994 |
| JP | 2000-128007 | 5/2000 |
| JP | 2003-256044 | 9/2003 |
| JP | 2004-136788 | 5/2004 |
| WO | WO 90 02985 | 3/1990 |
| WO | WO 02 08010 | 1/2002 |
| WO | WO 03/006288 | 1/2003 |

* cited by examiner

METHOD AND DEVICE FOR AVOIDING AND/OR REDUCING THE CONSEQUENCES OF COLLISIONS UPON EVASION WITH RESPECT TO OBSTACLES

BACKGROUND OF THE INVENTION

1. Field of the Invention

The present invention relates to a method and device for assisting a driver of a vehicle to avoid collisions with obstacles.

2. Description of Related Art

The increasing presence of electrically controllable braking and steering devices in motor vehicles, and of sensors that sense possible obstacles in the vehicle's surroundings, makes possible systems for avoiding and/or reducing the consequences of collisions with obstacles.

With the aid of surroundings-sensing systems, for example, it is possible to detect potential collisions with obstacles at an early stage. Such accidents can be avoided by timely warning of the driver or by influencing the vehicle's motion by way of controllable braking and steering devices. In critical situations, moreover, the braking system can be prepared for emergency braking or the restraint system can be prepared for an accident.

Among the sensors for sensing the vehicle's surroundings are, for example, ultrasonic, radar, lidar, and/or video systems. Available as controllable subsystems of braking systems for active pressure application are, for example, hydraulic units of ESP systems, actively controllable braking force intensifiers, electrohydraulic braking systems, or future electromechanical braking systems. Active steering systems or steer-by-wire (SBW) systems are possibilities for influencing steering.

Published German patent document DE 101 18 707 describes the carrying out of preparatory actions, in a context of a collision risk, that have no vehicle-decelerating effect but do prepare for vehicle deceleration.

Warning devices for collision avoidance have also been described, which are not aimed at assisting the driver in carrying out an evasive maneuver.

Systems for collision avoidance or collision consequence reduction intervene in the system by way of an active braking and/or steering intervention. The intensity of the braking interventions is, however, not optimized for assisting an evasive maneuver. For example, published European patent documents EP 1 300 275 and EP 0 891 903 describe a device that automatically brakes a vehicle at exactly the time when the latter, exploiting the limit of driving physics, can no longer avoid a collision with an obstacle. The individual escalation steps, with the associated interventions that ultimately lead to triggering of the system, are noted in published German patent document DE 102 20 567. For automatically guided vehicles, systems for evasion and for collision avoidance are described in published German patent document DE 38 30 790, published European patent document EP 0 433 322, or published international patent document WO 90 02985; for non-automatically guided vehicles, such systems are indicated in published international patent document WO 02 08010 and published German patent document DE 198 31 071, the latter not acting fully automatically but instead proposing the evasion trajectory to the driver by way of a steering torque.

Vehicle dynamics control method are also described which, however, have only the purpose of optimally implementing the driver's steering input. These devices do not, however, possess a surroundings sensor suite, but only a vehicle-related sensor suite. The braking interventions are therefore not capable of being adapted to the location of obstacles, but have only the purpose of stabilizing the vehicle operating state.

In addition, German Patent Application DE 10 2004 008894 of Feb. 24, 2004 describes a system that can assist an evasive maneuver by way of suitable haptic steering inputs. Simultaneous braking of the vehicle to optimize the evasion trajectory is not addressed.

A BRIEF SUMMARY OF THE INVENTION

The procedure presented hereinafter effectively allows avoidance, or reduction of the consequences, of accidents with obstacles by assisting the driver with evasion, on the basis of information about the motion state of the controlled vehicle and of the obstacles.

Advantageously, the assistance is constituted by a targeted, time-controlled braking of the own vehicle during the evasive operation, so that the driver can execute a better evasive maneuver than without braking. Furthermore, depending on how the system is configured, the driver's steering input can also be modified by way of a suitable steering actuator.

Action is thus applied in every case to the brake for evasion assistance, so that the driver given the ability to execute a more favorable evasion trajectory. Intervention occurs, however, at a point in time after which a collision can be avoided only by the correct combination of braking and steering. Advantageously, the driver is therefore actively assisted when a collision is still avoidable. A considerable time advantage thereby results, as compared with systems that intervene only when the collision is unavoidable.

DETAILED DESCRIPTION OF THE INVENTION

Figure 1:
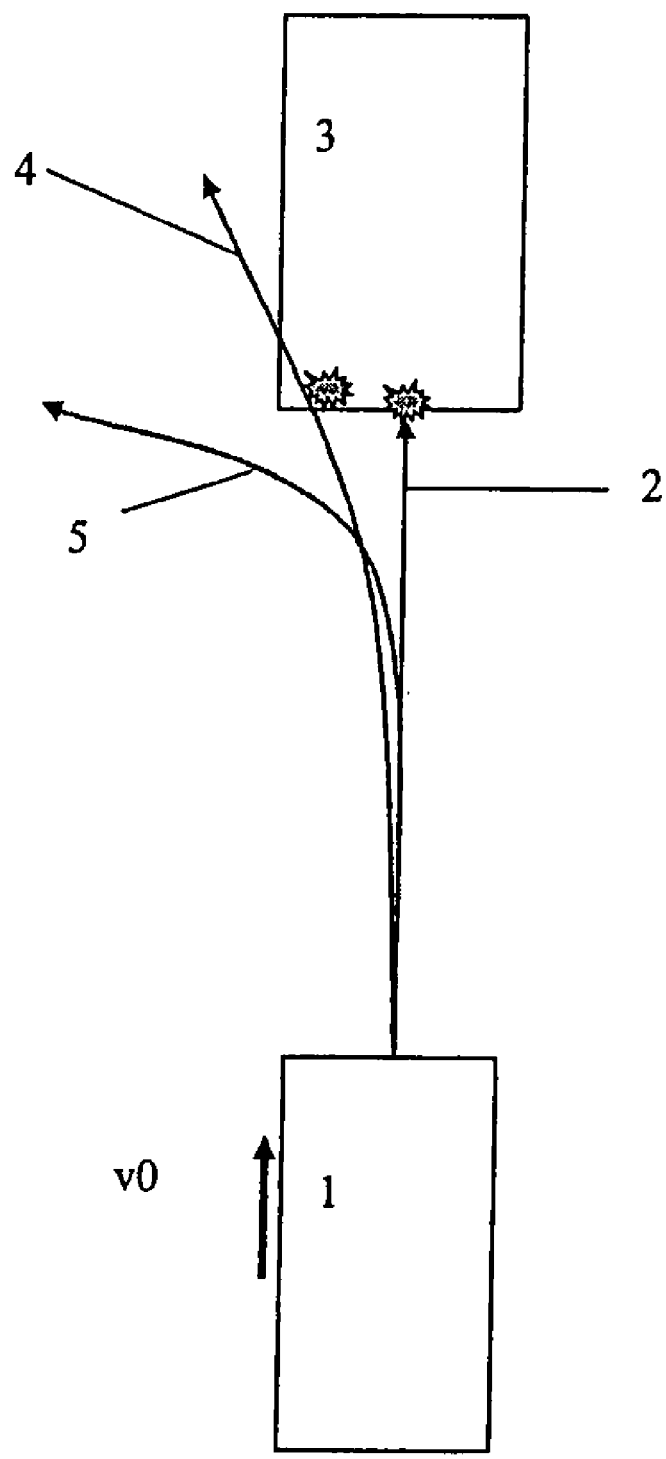
FIG. 1 schematically depicts the vehicle trajectories of different driving strategies for the scenario of an approach to an obstacle.

An assistance system for drivers of motor vehicles is described below, which system is based on the recognition that extreme evasive maneuvers at the limit of driving physics are made up of a combination of steering and braking actions. The limit of driving physics is characterized by the fact that the magnitude of the force transferable between the tires and road surface is limited. A driving maneuver at the limit of driving physics, hereinafter called an "extreme driving maneuver," is characterized in that the magnitude of the force corresponds at every point in time to the achievable limit magnitude. The force is thus located on what is known as the "Kamm circle," the change over time in the direction of force being arbitrary. The force can be broken down into a component parallel to the vehicle's longitudinal axis (longitudinal acceleration resulting from braking or accelerating) and a component transverse (perpendicular) to the vehicle's longitudinal axis (transverse acceleration due to steering). In an extreme braking maneuver (maximum braking), for example, a constant component acts only in the vehicle's longitudinal direction (braking only). In an extreme steering maneuver (extreme circular-course driving), however, there is only a constant component perpendicular to the vehicle's longitudinal axis (steering only).

As a vehicle (own vehicle) continues to approach an obstacle at a given relative speed $v_{rel}$, collision avoidance by braking is possible only up to a calculable limit distance $d_{braking}$. If the distance falls below this limit ($d<d_{braking}$), the only remaining means for collision avoidance is an evasive maneuver. Whether such an evasive maneuver is possible in the context of the limits of driving physics depends not only on the relative speed, but also on the extent (especially width) of the own vehicle and of the obstacle. It has been found that for finite object extents, a limit relative speed $v_{rel}>v_{relEvas}$ always exists above which collision avoidance is possible, by evasion, up to a smaller obstacle distance $d_{evasion}$ than an avoiding braking maneuver: $d_{evasion}<d_{braking}$. Analogously to the distance $d_{braking}$, the limit distance $d_{evasion}$ describes the distance up to which a collision is avoidable by way of an extreme evasive maneuver at the limit of driving physics. What is described in this context as an "extreme evasive maneuver" is the driving maneuver at the limit of driving physics that, for a given relative speed and obstacle distance (or obstacle acceleration, if applicable and available), produces the greatest possible offset perpendicular to the original direction of motion of the own vehicle at the location of the obstacle (largest possible displacement in the Y direction). To allow an extreme evasive maneuver of this kind to be performed, it is necessary to calculate an optimum change over time in the longitudinal and transverse acceleration (braking/steering) of the own vehicle. It has been found that a considerable longitudinal acceleration component by way of braking must be applied in order to carry out an extreme evasive maneuver. The assistance system described here is directed toward this need for a braking intervention in order to carry out an extreme evasive maneuver. The benefit is, in particular, based on the fact that the Y offset (the Y direction being transverse to the direction of travel) achievable by way of an extreme evasive maneuver with braking intervention is greater than in the case of an evasive maneuver resulting from steering only (transverse acceleration only). In other words: $d_{evasion}<d_{steering}$; $d_{steering}$ being the limit distance up to which a collision is avoidable by way of a steering maneuver only.

This means that there exists a distance and relative-speed region in which a collision is avoidable in terms of driving physics, but not by way of only a steering maneuver or only a braking maneuver. It is precisely this region that is addressed by the implementation described below.

If a driver attempts, by steering only, to evade an obstacle at a distance d such that $d_{evasion}<=d<d_{steering}$, this would result in a collision. This is recognized by the system, which calculates the change over time in the braking acceleration necessary for a collision-avoiding evasive maneuver, and automatically establishes it on the own vehicle from the beginning of the steering maneuver. The change over time in the transverse acceleration is also influenced, indirectly, by way of this braking intervention. Ideally, the driver can thereby perform an extreme or almost-extreme evasive maneuver that would not have been possible only via steering input without braking the vehicle.

In a further step, the system also intervenes in the own vehicle's steering system so that the transverse acceleration can also be further optimized in terms of an evasive maneuver.

Figure 2:
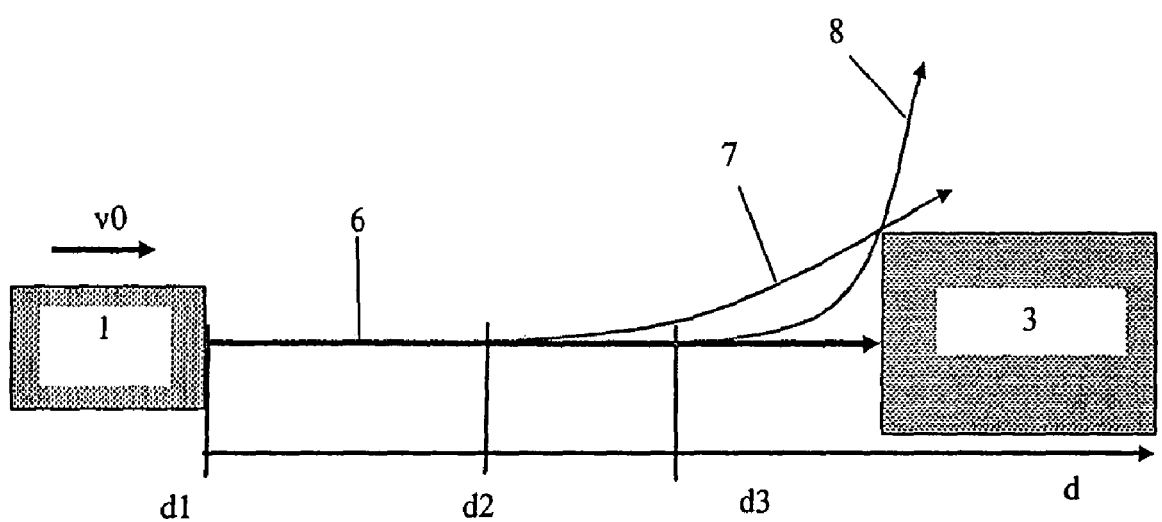
FIG. 2 schematically depicts the distances to the obstacle at which collisions can be avoided by way of different strategies.

The scenarios outlined above are depicted in FIGS. 1 and 2. FIG. 1 shows a vehicle 1 that is approaching an obstacle 3 at a speed v0. In order to avoid a collision or reduce the consequences, braking and steering interventions are available to the driver. The number 2 describes the trajectory resulting from an exclusive braking intervention. If the distance to the obstacle is too short, the collision is unavoidable. A similar consideration applies to an exclusive steering intervention (trajectory 4) for a corresponding extent of the obstacle in the Y direction. Trajectory 5 shows a situation with braking and steering intervention; here it is possible, in some circumstances, to avoid the collision.

FIG. 2 depicts the conditions under which a collision is or is not avoidable. Here again, a vehicle 1 approaching an obstacle 3 is depicted. The distance d is plotted horizontally. The vehicle moves at a speed v0. The trajectory for a braking intervention is shown as 6, for a steering intervention as 7, and for a combined steering and braking intervention as 8. Up to a distance d1 ($d_{braking}$) the collision can be avoided, or its consequences minimized, with maximum braking as the exclusive action. At less than a distance d2 ($d_{steering}$), this is achieved by an exclusive steering intervention; d2 is smaller than d1. At less than a distance d3 ($d_{evasion}$) the collision can be avoided, or the consequences minimized, with a combined braking and steering intervention. The distances here depend on the speed of the own vehicle, the speed of the obstacle, and the extents of the own vehicle and of the obstacle. The condition of the own vehicle's brakes and tires also play a role. For each situation, the corresponding distances are calculated. In an embodiment, a "braking intervention" means a maximum-braking intervention, and a "steering intervention" means a steering intervention at the physical limit. In another embodiment, a braking intervention having a specific delay and a steering intervention having a specific transverse acceleration are assumed for calculation purposes, for example values that a driver is usually capable of establishing in a hazard situation.

Figure 3:
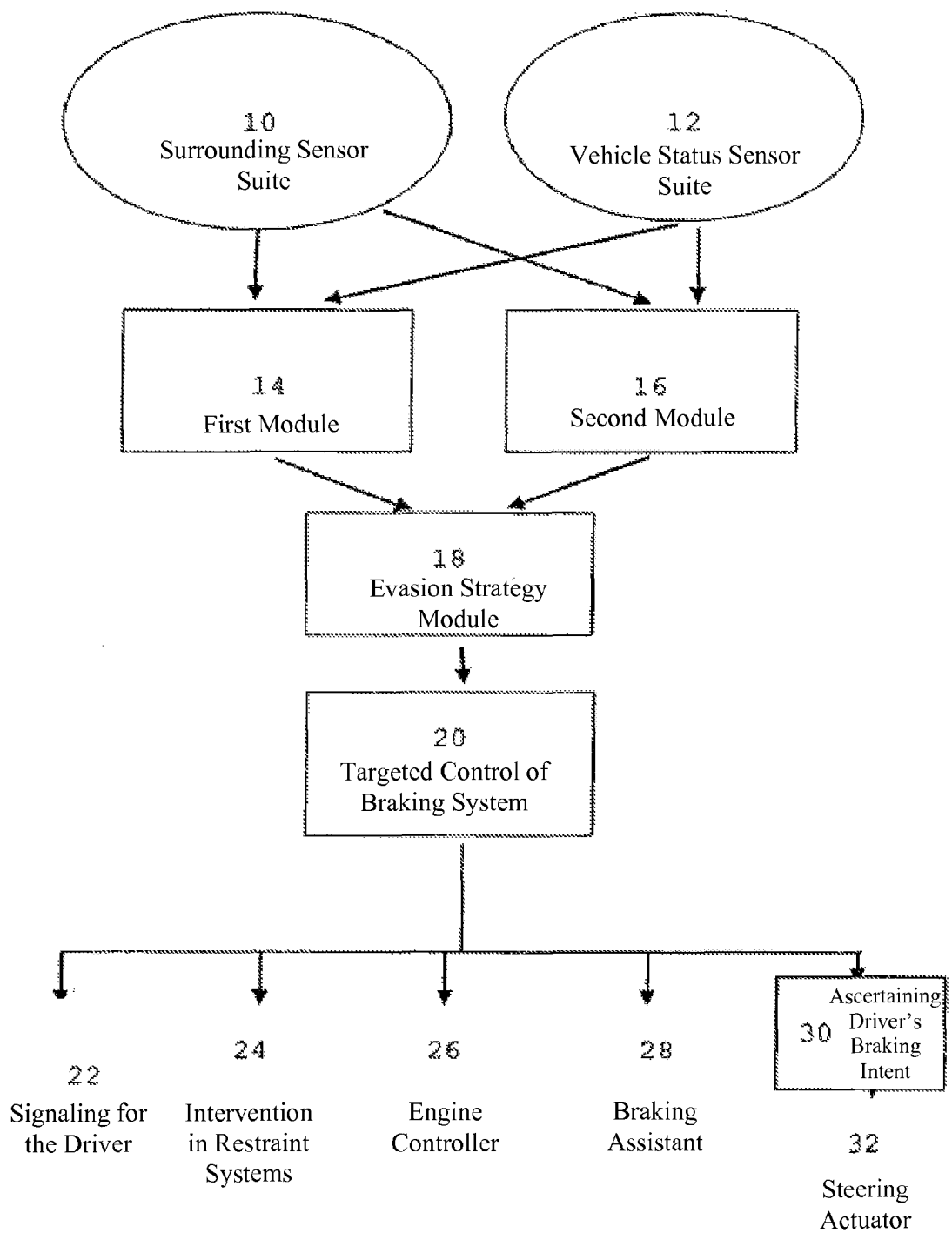
FIG. 3 is a flow chart of an example implementation of the method of the present invention.

FIG. 3 is a flow chart depicting an example implementation of the above procedure in the context of a program of a computer of a device (outlined below) for a driver assistance system.

The program outlined is cycled through at predetermined time intervals. It encompasses the following basic modules: One module detects when a collision with an obstacle is no longer avoidable only by braking. A further module detects when a collision with an obstacle is no longer avoidable only by steering. A further module calculates which steering and braking strategy is most favorable for the given motion parameters of the objects.

If a collision with an obstacle is no longer avoidable only by steering or only by braking, the optimum or predetermined vehicle deceleration corresponding to a steering intervention is established, and is continuously adapted to the changing motion parameters. As a result, the driver is in a position to execute trajectories that are more favorable, in terms of collision avoidance, than if the deceleration were not taking place.

Depending on how the system is configured, it is possible to adapt the driver's steering input, by way of a suitable steering actuator, to the favorable value that has been ascertained. One example embodiment of the system is to make the steering assistance by the system dependent on a previous steering-wheel actuation by the driver that expresses the evasive intent. The driver thus retains the capability of preferring a frontal collision with the obstacle over other strategies.

If the driver does not pursue any evasion strategy, the system will in any case reduce kinetic energy and thereby decrease the consequences of an accident.

In addition, the benefit of subsequent emergency braking systems will, if applicable, be enhanced by the fact that the braking system is already filled, and the necessary pump pressure has built up in the braking system. A greater braking effect can thus be achieved, since the system, unlike an emergency braking system, becomes active at a point in time at which a collision can still definitely be avoided by way of a simultaneous braking and steering intervention, but no longer only by steering or only by braking.

In a critical situation of this kind the driver can moreover be warned optically, acoustically, or haptically. Reversible safety systems can be activated at an early stage, or their setting parameters can be adapted.

The system just outlined assists the driver in evading obstacles by controlled braking of the vehicle. The braking is adapted to the locations and motion parameters of the objects (own vehicle and obstacle). The system reduces the consequences of collisions by braking the vehicle. The system utilizes surroundings sensor equipment (at least one of the radar, lidar, video, infrared, ultrasonic, etc. sensors). The following additional system expressions are conceivable: The driver's steering input can be modified by a suitable steering actuator so that a better evasion trajectory is implemented. If a collision is unavoidable, an automatic emergency braking action can be performed. The driver is warned and informed of the critical situation. Reversible restraint means are triggered. Reversible (braking assistant) and irreversible restraint means (airbags) are reparameterized.

From a surroundings sensor suite 10 (encompassing e.g. a video, radar, lidar, ultrasonic, and/or infrared-only sensor), variables such as relative speed, distance, extent of the obstacle, etc. are delivered to first and second modules 14, 16. A vehicle status sensor suite 12, which senses e.g. steering angle, brake actuation, yaw rate, etc., delivers the corresponding variables to modules 14 and 16. From these variables, taking into account predetermined values with respect to braking deceleration and transverse acceleration, modules 14 and 16 calculate the distances below which a collision is no longer possible only by braking or only by steering. On the basis of a suitable vehicle model, the distance to the obstacle for the last possible braking maneuver and last possible steering maneuver are relatively easy to determine by moving the model to the vehicle stability limit for both maneuvers. The complexity of the model has a critical influence on the quality of the two calculated distances. In the simplest case, this can be accomplished using an estimate of the coefficient of friction between the vehicle and roadway, and a point-mass model. Assuming a maximum transferable acceleration of 1 g, the last possible distances for an obstacle distance q can very easily be calculated based on the following kinematic equations ($V_{own}$=speed of the own vehicle, $V_{obstacle}$=speed of the obstacle, $\Delta x$=last possible distance):

Braking:

$$\Delta x = \frac{(v_{own} - v_{obstacle})^2}{2g}$$

Steering:

$$\Delta x = \sqrt{\frac{2q(v_{own} - v_{obstacle})^2}{g}}$$

A comparison with the current distance then indicates that a collision is no longer avoidable only by braking or steering.

If it is detected that it is no longer possible to avoid a collision only by braking or only by steering, an evasion strategy is identified in module 18 on the basis of the distance, the relative speed, and a predetermined deceleration and transverse acceleration. Proceeding from a point-mass model for the vehicle and obstacle motions, an extreme-value problem is formulated:

Longitudinal motion:

$$\Delta x = v_{own}t + \frac{1}{2}a_x t^2$$

Transverse motion:

$$q = \frac{1}{2}a_y t^2$$

The time t can be eliminated, yielding a function $\Delta x = f(a_x, a_y)$. The minimum of this function then yields the minimum distance along the obstacle that just avoids a collision, and thus leads to an analytical solution for the transverse and longitudinal accelerations $a_x$, $a_y$. To take into account the actual vehicle behavior, the calculated solution is correspondingly modified and optimized based on a detailed vehicle model. From the known transverse and longitudinal acceleration curves, the relevant steering and braking interventions are then determined. The appropriate strategy then consists at least in a braking intervention in accordance with the calculated curve, with the associated assisting steering intervention if applicable.

In the next step 20, the calculated braking (deceleration) is carried out. This is accomplished by targeted control of the braking system, e.g., in the context of a deceleration control loop. In addition to braking, optical, acoustic, and/or haptic signaling 22 for the driver is performed, as well as an intervention in restraint systems 24 that are present and in engine controller 26, e.g., to reduce torque, and/or initiation of an emergency braking action or reparameterization of braking assistant 28. Provision can furthermore be made, additionally or alternatively, to ascertain the driver's evasion intent in step 30 (e.g., on the basis of steering angle), and as a function thereof to apply control to a steering actuator 32 in order to intensify the driver's intervention.

Figure 4:
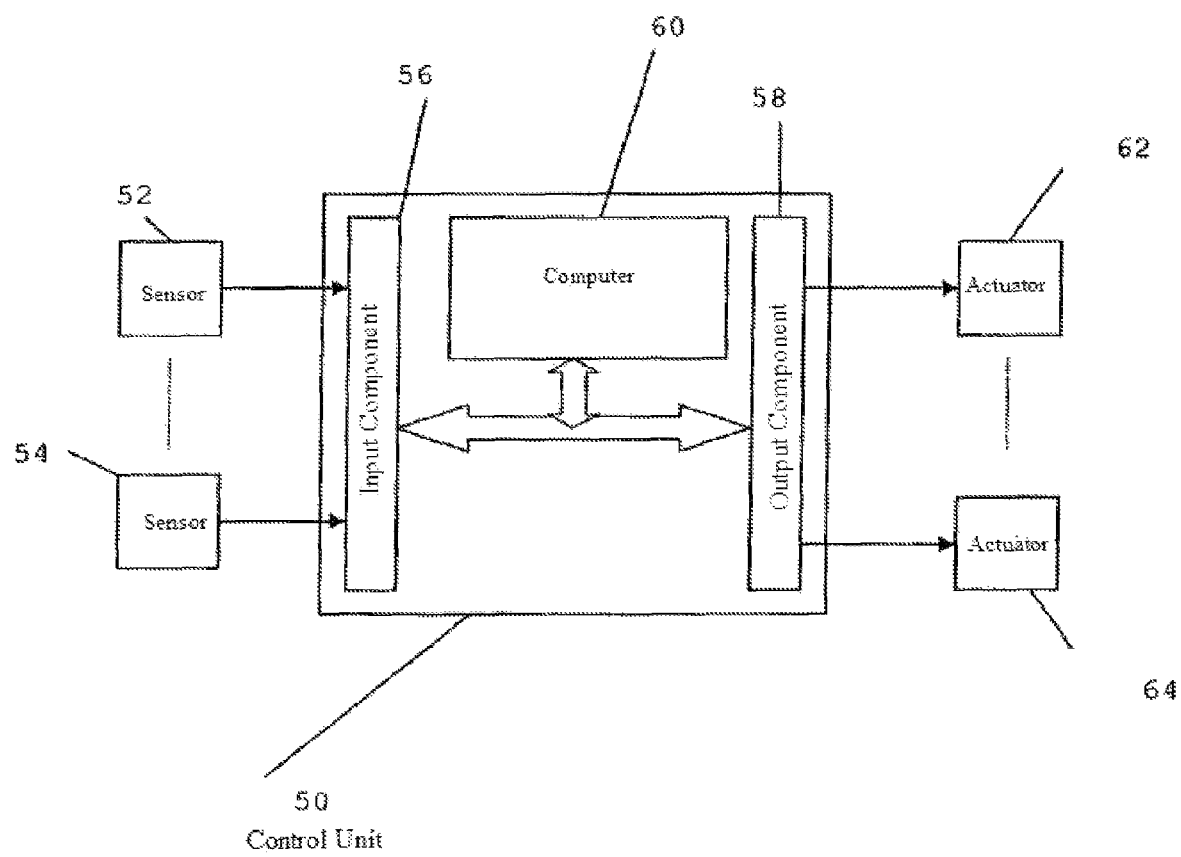
FIG. 4 depicts a device for implementing the method shown in the chart.

FIG. 4 shows a device for carrying out the procedure outlined above. A control unit 50 is provided, to whose input component 56 signals are delivered from surroundings sensors 52 to 54. These sensors are, depending on the embodiment, one or more sensors such as video, radar, ultrasonic sensors. Control unit 50 is substantially made up of input component 56, computer 58, and output component 58. These components are interconnected by way of a bus system. Control is applied to actuators 62 to 64 (e.g., brakes and/or a steering system) via the output components. The program outlined above executes in computer 58, and the aforementioned input and output signals are conveyed via components 56 and 60.

What is claimed is:

1. A method for assisting a driver of a vehicle to avoid a collision with an obstacle, comprising:

detecting at least one obstacle by using at least one surroundings sensor, wherein physical data of the at least one obstacle is ascertained;

ascertaining, on the basis of the physical data of the at least one obstacle and physical data of the vehicle, a deceleration of the vehicle for a maneuver of the vehicle which, when performed in conjunction with a potential evasive steering operation by the driver providing a transverse vehicle motion, avoids the collision;

determining on the basis of the physical data of the at least one obstacle and the physical data of the vehicle whether the collision with the obstacle is avoidable by steering alone;

responsive to determining that the collision with the obstacle is not avoidable by steering alone, initiating a deceleration of the vehicle in accordance with the ascertained deceleration;

after initiating the deceleration, executing code:
   to determine whether the driver has initiated an evasive action; and
   that provides that:
      responsive to a determination that an evasive action of the driver that includes the steering operation has been initiated, performing a steering assistance in conjunction with the decelerating of the vehicle in accordance with the ascertained deceleration, wherein the steering assistance includes modifying by a steering actuator the driver's steering input so that a determined evasive trajectory of the vehicle for avoiding the collision is implemented; and
      responsive to a determination that no evasive action of the driver has been initiated, decelerating the vehicle to minimize negative effects of the collision without performing a steering assistance.

2. The method as recited in claim 1, wherein the physical data of the at least one obstacle include at least one of motion parameters and extent parameters of the at least one obstacle.

3. The method as recited in claim 1, wherein the physical data of the vehicle include motion parameters of the vehicle.

4. The method as recited in claim 1, wherein in determining whether a collision with the obstacle is avoidable, motion-dynamics possibilities of the vehicle and the at least one obstacle are considered.

5. The method as recited in claim 1, further comprising:
warning the driver of the condition in which a collision is unavoidable by steering alone, wherein the warning is at least one of optical, acoustical and haptic warning.

6. The method as recited in claim 1, further comprising:
performing a reparameterization of a restraint system if it is determined that a collision is unavoidable by steering alone.

7. The method as recited in claim 1, wherein the decelerating is performed at a time determined to be while collision with the at least one obstacle is avoidable.

8. The method as recited in claim 1, wherein a determination is made on the basis of the physical data of the at least one obstacle and the physical data of the vehicle whether a collision with the obstacle is avoidable by braking of the vehicle alone, and wherein the initiating of the deceleration of the vehicle is performed if the collision with the obstacle is not avoidable by braking alone.

9. The method as recited in claim 8, wherein the physical data of the at least one obstacle include at least one of motion parameters and extent parameters of the at least one obstacle.

10. The method as recited in claim 8, wherein the physical data of the vehicle include motion parameters of the vehicle.

11. The method as recited in claim 8, wherein in determining whether a collision with the obstacle is avoidable, motion-dynamics possibilities of the vehicle and the at least one obstacle are considered.

12. The method as recited in claim 8, further comprising:
warning the driver of the condition in which a collision is unavoidable by braking alone, wherein the warning is at least one of optical, acoustical and haptic warning.

13. The method as recited in claim 8, further comprising:
actuating a reversible restraint system if it is determined that a collision is unavoidable by braking alone.

14. The method as recited in claim 8, further comprising:
performing a reparameterization of a restraint system if it is determined that a collision is unavoidable by braking alone.

15. A device for assisting a driver of a vehicle to avoid a collision with an obstacle, comprising:
   at least one surrounding sensor configured to detect at least one obstacle; and
   a control unit configured to receive signals from the at least one surroundings sensor, wherein the control unit:
      ascertains physical data of the at least one obstacle on the basis of the signals from the at least one surrounding sensor;
      is configured to ascertain, on the basis of the physical data of the at least one obstacle and physical data of the vehicle, a deceleration of the vehicle for a maneuver of the vehicle which, when performed in conjunction with a potential evasive steering operation by the driver providing a transverse vehicle motion, avoids the collision;
      generates control signals to initiate a deceleration of the vehicle in accordance with the ascertained deceleration in response to determining that the collision with the obstacle is not avoidable by steering alone;
      determines on the basis of the physical data of the at least one obstacle and the physical data of the vehicle whether the collision with the obstacle is avoidable by steering alone;
      is configured to perform the following after initiating the deceleration:
         respond to a detection of an evasive action of the driver that includes the steering operation, by performing a steering assistance in conjunction with the decelerating of the vehicle in accordance with the ascertained deceleration, wherein the steering assistance includes modifying by a steering actuator the driver's steering input so that a determined evasive trajectory of the vehicle for avoiding the collision is implemented; and
         respond to a failure to detect any evasive action of the driver, by decelerating the vehicle to minimize negative effects of the collision without performing a steering action.

16. A method for assisting a driver of a vehicle to avoid a collision with an obstacle, comprising:
   detecting at least one obstacle by using at least one surroundings sensor, wherein physical data of the at least one obstacle is ascertained;
   ascertaining, on the basis of the physical data of the at least one obstacle and physical data of the vehicle, a deceleration of the vehicle for a maneuver of the vehicle which includes a steering operation by the driver providing a transverse vehicle motion;
   applying the physical data of the at least one obstacle and the physical data of the vehicle to determine where, in a range of distances, the vehicle is located relative to the obstacle, the range of distances including, in order of decreasing distance, a first distance in which the collision is avoidable by braking alone, a second distance in which the collision is avoidable by steering alone, and a third distance in which the collision can only be avoided by a combination of steering and braking; and responsive to determining that the current distance between the vehicle and the obstacle is less than or equal to the third distance:

determining an optimal steering and braking strategy and performing a braking in accordance with the optimal strategy to assist a potential evasive steering performed by the driver;

determining whether there is an evasive intent based on steering input from the driver;

if it is determined that there is the evasive intent, responsive to the determining that there is the evasive intent, triggering a steering actuator to adapt the driver's steering input to a steering value corresponding to the optimal strategy; and if it is determined that there is not the evasive intent, responsive to the determining that there is not the evasive intent, triggering a braking actuator to further reduce a kinetic energy of the vehicle without triggering the steering actuator.

17. The method of claim 16, further comprising calculating the first, the second, and the third distances based on a specific delay for braking intervention and a specific transverse acceleration that can be driver established during a hazard situation.

\* \* \* \* \*

UNITED STATES PATENT AND TRADEMARK OFFICE
CERTIFICATE OF CORRECTION

PATENT NO.       : 8,392,062 B2                                               Page 1 of 1
APPLICATION NO. : 11/795108
DATED            : March 5, 2013
INVENTOR(S)      : Oechsle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1267 days.

Signed and Sealed this
First Day of September, 2015

Michelle K. Lee
*Director of the United States Patent and Trademark Office*